United States Patent Office 3,419,537
Patented Dec. 31, 1968

3,419,537
DICYANOACETYLENE POLYMERS
Alan Rembaum, Altadena, Calif., and Arnold W. Henry, Akron, Ohio, assignors, by mesne assignments, to the United States of America as represented by the Administrator of the National Aeronautics and Space Administration
No Drawing. Filed Sept. 3, 1965, Ser. No. 485,058
3 Claims. (Cl. 260—85.5)

ABSTRACT OF THE DISCLOSURE

Copolymers of dicyanoacetylene and vinylidene compounds are made by mixing the two materials, preferably in a solvent such as tetrahydrofuran in the presence of an initiator which preferably is a free radical initiator such as azo-bis-isobutyronitrile. The mixture is preferably deaerated then sealed at subatmospheric pressure and heated between about 40° C. and 70° C. for 10 to 30 hours.

---

This invention relates to dicyanoacetylene (DCA) copolymers, and methods for making such copolymers.

Origin of the invention

The invention described herein was made in the performance of work under a NASA contract and is subject to the provisions of Section 305 of the National Aeronautics and Space Act of 1958, Public Law 85–568 (72. Stat. 435; 42 USC 2457).

The preparation and properties of polymerized DCA (poly-DCA) is described in a paper entitled "Polydicyanoacetylene: Preparation and Properties" by M. Benes, J. Peska, and O. Wichterle, Journal of Polymer Science: Part C, No. 4, pages 1377–1383.

Poly-DCA prepared by ionic polymerization methods is believed to have the structure $$\left[\begin{array}{cc}CN & CN \\ | & | \\ -C\!\!=\!\!C- \end{array}\right]_n$$

where $n$ is an integer. This material has some measure of conductivity and is reported to be stable up to a dull red heat. However, the polymerized DCA by itself is intractable and has no or poor plastic properties, which makes it difficult or impossible to use in many applications where its good heat-resisting ability would be useful. The copolymer made in accordance with this invention is more plastic than polymerized DCA by itself and can be molded as well as applied as a coherent film from a solution.

Poly-DCA has good heat-resisting properties, but it is usually in the form of a powder which will not cohere to itself or form good films. Consequently, poly-DCA has not found wide commercial use.

This invention provides a copolymer of DCA (DCA polymerized with another monomer) which has good heat stability, is a semi-conductor, and can be applied as a coherent film. Such properties permit the material of this invention to be used in thermoelectric devices, transistors, solar batteries, rocket motor casings, nose cones, and a host of other materials where semiconducting properties or thermal stability is important.

Briefly, this invention provides an organic plastic copolymer resulting from the copolymerization of DCA and a monomer which includes the vinyl radical. Preferably, the organic plastic copolymer of this invention is dissolved in a solvent and applied as a coherent film which has enhanced thermal stability and improved film-forming characteristics, as well as being a semiconductor on its own, or when complexed with electron-donating compounds.

In terms of method, the copolymer of this invention is made by mixing DCA with an organic compound which includes a vinyl radical

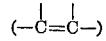

in the presence of an initiator, which can be an ionic initiator, but preferably is a free radical initiator.

The DCA and organic compound with the vinyl radical can be mixed in various proportions, depending on the degree of plasticity and heat resistance required of the ultimate product. Ordinarily, useful copolymers are obtained when the range of monomer with the vinyl radical is between about 5% and about 90% by weight of the total DCA and other monomer present in the final product. Typically, the DCA and the organic compound with a vinyl radical are mixed in proportions of about one-to-one by weight, and dissolved in a solvent, which is preferably a polar solvent, such as tetrahydrofuran, in the presence of an initiator, which preferably is a free-radical initiator, such as azo-bisisobutyronitrile. Good results are obtained when the mixture is sealed off under a vacuum of about $10^{-5}$ mm./Hg and heated between about 40° C. and about 70° C. for ten to thirty hours. Results are improved if the mixture is first deaerated either by bubbling nitrogen or other non-oxygen-containing gas through the mixture, or by cooling the mixture to a temperature of liquid nitrogen and subjecting it to a vacuum to degas it. Preferably, the cooling and degassing cycle is repeated several times to thoroughly deaerate the mixture. For example, the mixture is cooled, evacuated, brought back to or near atmospheric pressure in the presence of an inert gas, warmed, say, to room temperature, thereafter cooled to liquid nitrogen temperature, and again evacuated.

These and other aspects of the invention will be more fully understood from the following detailed description.

A copolymer of DCA and styrene which has good plastic and heat-resistant properties is prepared in accordance with the following example.

EXAMPLE

| Compound | Preferred amount | Permissible range, gram |
|---|---|---|
| DCA | 1 gram | 1 |
| Styrene | do | .5–9 |
| Tetrahydrofuran (solvent) | 15 grams (20 cc.) | 3–100 |
| Azo-bis-isobutyronitrile (initiator) | .02 gram (.1% by weight) | .002–0.2 |

The compounds listed in the above example were treated as follows. The DCA, styrene, and azo-bis-isobutyronitrile were dissolved in the tetrahydrofuran and cooled to the temperature of liquid nitrogen. The cooled mixture was degassed by evacuating it to an absolute pressure of less than $10^{-5}$ mm./Hg. An inert atmosphere of nitrogen was then admitted to the mixture until the pressure was again atmospheric. The mixture was warmed to room temperature, again cooled to the temperature of liquid nitrogen, and thereafter evacuated to an absolute pressure less than $10^{-5}$ mm./Hg. This heating, cooling, and evacuating cycle was repeated several times until substantially all of the oxygen was removed from the mixture. Thereafter, the cooled mixture was sealed off under an absolute pressure of $10^{-5}$ mm./Hg and placed in an oven at 55° C. for twenty-one hours. Thereafter, the sealed container was opened. An analysis of the mixture showed a 70% to 95% yield of dark brown copolymerized DCA and styrene. The material was found to be stable to about 280° C. and was capable of forming a coherent film.

The copolymer, made in accordance with the foregoing example, is particularly useful in making organic semiconductors. The semiconducting property of the copolymer can be altered by the addition of electron-donating compounds.

The thermal stability as well as the electronegativity and conductivity characteristics which the DCA imparts to the copolymer makes it a useful material for many other systems. For example, the copolymer is applied as a coating to glass fiber filament which is wound to form rocket motor casings or nose cones where thermal stability is important.

Monomers other than styrene can be used in making copolymers of this invention. For example, any organic compound containing the vinyl radical can be used. Examples are methyl methacrylate, butadiene, isoprene, isobutylene, acrylonitrile, ethylene, and propylene.

Other polymer solvents which can be used in place of the tetrahydrofuran are dimethoxy ethane, dioxane, and dimethylformamide. Suitable nonpolar solvents are benzene, toluene, and xylene. Other polymer and nonpolymer solvents will readily occur to chemists skilled in this field.

Other free radical initiators which can be used in addition to the azo-bis-isobutyronitrile are tertiary butyl hydroperoxide and benzoyl peroxide. Ionic initiators can also be used. Examples of these are butyllithium, butylmagnesium bromide, monolithium benzophenone, lithium naphthalene, and sodium naphthalene.

Instead of deaerating the mixture prior to reaction by repeated heating, cooling, evacuation and repressurizing, air is removed by bubbling an inert gas, such as nitrogen, through the mixture at room temperature or lower. However, the heat-cool and evacuate-pressurize cycling is preferred because it reduces solvent loss due to vaporization when a gas is bubbled thru the solution.

Because of the strong electronegative properties of the copolymer imparted by the DCA structure, the product adheres tenaciously to surfaces which are electropositive. Such surfaces are glass, plastics which have electropositive surfaces, and metals which have electropositive surfaces. Thus, the copolymer resins of this invention are ideally suited for coating glass and other electropositive surfaces. Moreover, the high temperature resistance of the product makes it possible to design semiconductors which can withstand wide temperature ranges.

What is claimed is:

1. The method of making a copolymer comprising mixing dicyanoacetylene with an organic compound which includes a

radical and selected from the group consisting of styrene, methyl methacrylate, butadiene, isoprene, isobutylene, acrylonitrile, ethylene, and propylene, the said organic compound being present in the amount between about 5% and about 90% by weight of the dicyanoacetylene, in the presence of an intiator selected from the group consisting of azo-bis-isobutyronitrile, tertiary butyl hydroperoxide, benzoyl peroxide, butyllithium, butylmagnesium bromide, monolithium benzophenone, lithium naphthalene, and sodium naphthalene, sealing the mixture in a container at subatmospheric pressure, and heating the sealed-off mixture to between about 40° C. and about 70° C. from about ten to about thirty hours to form a copolymer of the dicyanoacetylene and said organic compound.

2. A method according to claim 1 which includes the steps of cooling the mixture of dicyanoacetylene and the said organic compound substantially below room temperature, degassing the cooled mixture by reducing the pressure to subatmospheric, and increasing the pressure of the mixture in the presence of an inert gas prior to reacting the mixture at a temperature of about 20° C. and about 70° C.

3. A method according to claim 2 in which the cooling, degassing, and increasing of pressure in the presence of an inert gas is repeated several times prior to reacting the mixture at a temperature between about 40° C. and about 70° C.

References Cited

UNITED STATES PATENTS 2,657,200  10/1953  McGrew et al. _____ 260—85.5

OTHER REFERENCES

Peska et al., J. Pol. Sci., Part C, No. 4, pp. 1377 to 1383.

JOSEPH L. SCHOFER, *Primary Examiner.*

H. WONG, JR., *Assistant Examiner.*

U.S. Cl. X.R.

260—82.5, 82.3; 252—500; 117—124